United States Patent [19]

Ford, Jr. et al.

[11] 4,247,459
[45] Jan. 27, 1981

[54] AZO DYE DERIVATIVES OF 2,3-NAPHTHALENEDIOLS

[75] Inventors: John A. Ford, Jr.; Louis J. Rossi, both of Rochester, N.Y.

[73] Assignee: Eastman Kodak Company, Rochester, N.Y.

[21] Appl. No.: 56,180

[22] Filed: Jul. 10, 1979

Related U.S. Application Data

[63] Continuation of Ser. No. 860,529, Dec. 14, 1977, abandoned, and a continuation of Ser. No. 691,667, Jun. 1, 1976, abandoned.

[51] Int. Cl.³ .............................................. C09B 33/02
[52] U.S. Cl. .................................. 260/185; 260/174; 260/177; 260/187; 260/191
[58] Field of Search ............... 260/174, 177, 185, 187, 260/191

[56] References Cited

U.S. PATENT DOCUMENTS

2,497,246   2/1950   von Glahn .......................... 260/186

FOREIGN PATENT DOCUMENTS

82774   7/1893   Fed. Rep. of Germany ........... 260/185

OTHER PUBLICATIONS

Lubs, "The Chemistry of Synthetic Dyes and Pigments", Reinhold Publishing Corp., N.Y. (1955), pp. 670–671.

*Primary Examiner*—Paul F. Shaver
*Attorney, Agent, or Firm*—William T. French

[57] ABSTRACT

Azo dye compounds of substantially neutral density which are particularly useful in liquid electrographic developers and are of the formula:

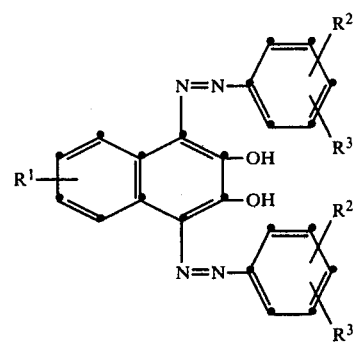

wherein:
$R^1$ is hydrogen, —COOH, —CONH$_2$, —SO$_2$NH$_2$ or —SO$_3$M and M is a cation;
$R^2$ is a lower alkoxy radical, —OCH$_2$CONH$_2$, or

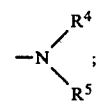

$R^3$ is hydrogen or nitro; and
$R^4$ and $R^5$ are the same or different lower alkyl or lower hydroxyalkyl radicals.

17 Claims, 1 Drawing Figure

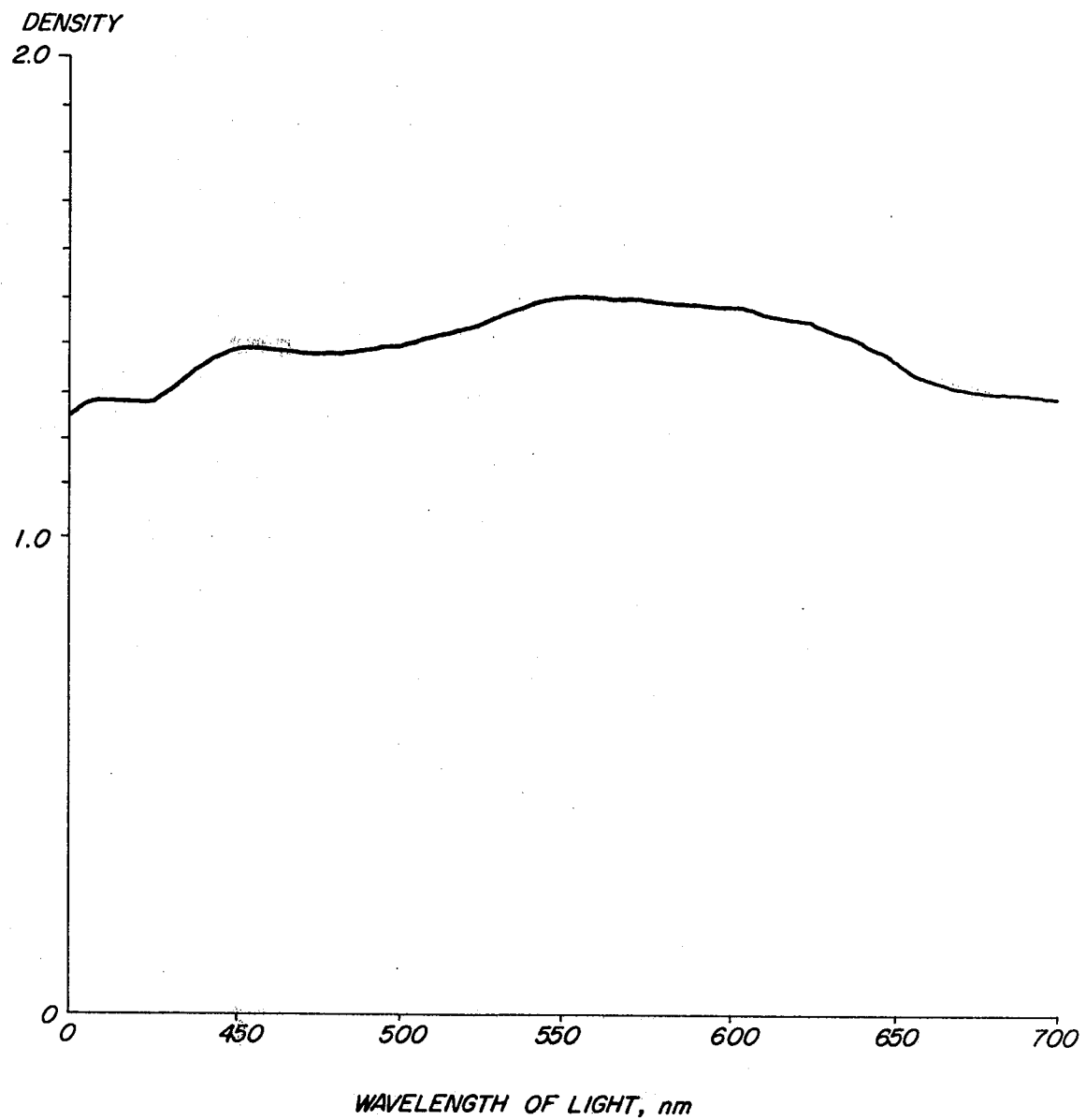

AZO DYE DERIVATIVES OF 2,3-NAPHTHALENEDIOLS

This application is a continuation of Ser. No. 691,667 filed June 1, 1976, now abandoned, and of Ser. No. 860,529 filed Dec. 14, 1977, now abandoned.

FIELD OF THE INVENTION

This invention relates to azo dye compounds and particularly to dyes which are the reaction product of 2,3-naphthalenediol and certain diazonium salts. These dyes are particularly useful for making liquid electrographic developers.

BACKGROUND OF THE INVENTION

Insoluble dyes have been used as pigments in prior-art electrographic liquid developers. However, processes using such prior-art developers have generally suffered from the poor dispersion stability of such developers and/or poor light stability of the developed image. Prior-art processes which use carbon as the pigment in electrographic liquid developers yield black developed images with good visual density at 550 nm. but have generally suffered from such problems as batch-to-batch nonuniformity and yield poor continuous tone images on print materials such as vesicular elements. Thus, there is a continuing need for insoluble dyes which can be used as pigments in electrographic liquid developers to provide such developers with improved dispersion stability and to provide developed images having improved stability to light. In particular, there is a need to provide an insoluble dye having the desirable neutral density color characteristics of carbon without the previously mentioned problems of carbon when used in liquid developers.

The azo dyes of the present invention can be used to make electrographic liquid developers which have good dispersion stability, which yield good light stability of developed images, and which can provide good continuous tone images and good batch-to-batch uniformity. Electrographic liquid developers made using the azo dyes of the present invention further provide high-quality developed images having low contrast and high resolution.

Various azo dyes containing naphthalene and hydroxynaphthalene groups are described in U.S. Pat. Nos. 1,718,882, 2,244,339, 2,553,261, 2,758,109, 3,384,632, 3,580,901 and 3,781,208, British Pat. No. 1,370,197, and Canadian Pat. No. 926,681. Few of these dyes appear to exhibit color in the blue region of the spectrum. Most of them are more warmly colored, exhibiting orange-red, red-magenta, and brown hues. The azo dyes of the present invention differ structurally from those discussed above and generally exhibit blue or neutral density coloration.

SUMMARY OF THE INVENTION

The present invention provides a new class of dyes which are formed by coupling diazonium salts with 2,3-naphthalenediol derivatives. The dyes have a structure according to the following formula:

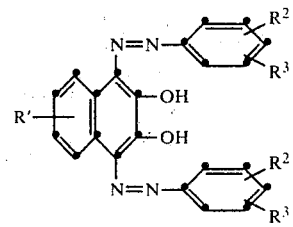

wherein:

$R^1$ is H, COOH, $CONH_2$, $-SO_2NH_2$ or $-SO_3M$ where M is $Na^+$, $NH_4^+$ or like cations;

$R^2$ is a lower alkoxy radical having from 1 to about 4 carbon atoms (such as, for example, $-OCH_3$, $-OC_2H_5$, $n-C_3H_7O-$, etc.), $-OCH_2CONH_2$ or

where each of $R^4$ and $R^5$ is selected from lower alkyl radicals having 1-4 carbon atoms and hydroxy-substituted lower alkyl radicals such as etc.; and $R^3$ is H or $NO_2$.

The dyes of this invention are generally useful as dyes and pigments in a variety of known processes. Among the many uses of these dyes is their use as pigments in electrographic liquid developers. Such electrographic liquid developers made using the dyes of this invention exhibit good dispersion stability and yield high-quality developed images having low contrast, high resolution and stability to light.

Certain preferred dyes of this invention exhibit a unique spectral response. These dyes absorb radiation relatively uniformly in the range of from about 400 nm. to about 700 nm. and therefore exhibit a neutral density coloration. The dyes exhibiting this neutral density coloration are the disazo dyes of Formula I wherein $R^4$ is an arylazo and $R^2$ is $-OCH_2CONH_2$ or a lower alkoxy group having from 1-4 carbon atoms.

FIG. 1 illustrates a spectral response curve of certain preferred dye compounds of this invention that exhibit substantially neutral density coloration.

DETAILED DESCRIPTION OF THE INVENTION

In accordance with the present invention, a new class of dyes is provided by coupling diazonium salts with 2,3-naphthalenediol derivatives according to the following reaction:

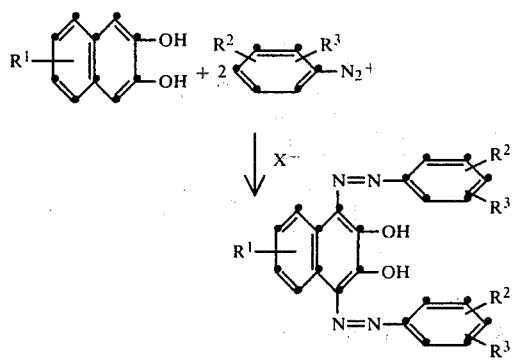

wherein $X^-$ is an anion and the R's are the same as defined hereinabove. When the diazonium salt is complexed with a heavy metal cation the dye salt structure of Formula I is obtained. Various heavy metal cations can be used to obtain the dye salt, including the cation of Zn, Cd, Sn and other like metal cations.

As used herein, the terms "lower alkyl radical" and "lower alkoxy radicals" include those such radicals having from 1 to about 4 carbon atoms in the unsubstituted radical.

Examples of the dyes provided by this invention include:

1,4-bis[p-(N-ethyl-N-2-hydroxyethylamino)-phenylazo]-2,3-naphthalenediol;

1,4-bis[4-(N-ethyl-N-2-hydroxyethylamino)-phenylazo]-2,3-dihydroxy-7-naphthalenesulfonic acid ammonium salt;

1,4-bis(p-anisylazo)-2,3-naphthalenediol;

1,4-bis(o-anisylazo)-2,3-naphthalenediol;

1,4-bis(p-ethoxyphenylazo)-2,3-naphthalenediol;

1,4-bis(4-n-propoxyphenylazo)-2,3-naphthalenediol;

1,4-bis(p-anisylazo)-2,3-dihydroxynaphthalenesulfonic acid sodium salt;

1,4-bis(o-anisylazo)-2,3-dihydroxynaphthalenesulfonic acid sodium salt;

1,4-bis(4-anisylazo)-2,3-dihydroxy-6-naphthalenesulfonamide;

1,4-bis(4-carbamoylmethoxyphenylazo)-2,3-naphthalenediol;

1,4-bis(2-nitrio-4-anisylazo)-2,3-naphthalenediol; and 1,4-bis(5-nitro-2-anisylazo)-2,3-naphthalenediol.

Among the uses for the dyes of this invention is their use as pigments in making electrographic liquid developers. After the dye is formed in accordance with the present invention, it is used to prepare a liquid developer suitable for developing electrostatic charge patterns. Typically developers are prepared by grinding or ball-milling one of the pigments with a suitable polymer solution to make a concentrate and diluting this concentrate with an insulating carrier liquid. The resultant developer is in the form of a carrier liquid having dispersed therein toner particles comprised of the pigments of this invention and a suitable resinous material.

Carrier liquids which may be used to form such developers can be selected from a wide variety of materials. Preferably, the liquid has a low dielectric constant and a very high electrical resistance such that it will not disturb or destroy the electrostatic latent image. In general, useful carrier liquids should have a dielectric constant of less than about 3, should have a volume resistivity of greater than about $10^{10}$ ohm-cm., and should be stable under a variety of conditions. Suitable carrier liquids include halogenated hydrocarbon solvents, for example, fluorinated lower alkanes, such as trichloromonofluoromethane, trichlorotrifluoroethane, etc., having a typical boiling range of from about 2° C. to about 55° C. Other hydrocarbon solvents useful as carrier liquids are isoparaffinic hydrocarbons having a boiling range of from about 145° C. to about 185° C., such as Isopar G (Humble Oil & Refining Co.); or cyclohydrocarbons having a major aromatic component and a boiling range of from about 145° C. to about 185° C., such as Solvesso 100 (Humble Oil & Refining Co.). Additional useful carrier liquids include polysiloxanes, odorless mineral spirits, octane, cyclohexane, etc.

In addition to the dyes or colorants of the present invention which are dispersed as pigments in the carrier liquid, a resinous material can be used if desired to facilitate binding of the colorant to the surface to be developed. Suitable resinous materials used in the present developers appear to form a coating around each colorant particle and thus also facilitate dispersion of the colorants in the carrier liquid. Useful resins can be selected from a wide variety of substances. The following are illustrative of suitable materials: rosins, including hydrogenated rosins and esters of hydrogenated rosins; alkyl methacrylate copolymers having from 2-5 carbon atoms in each alkyl moiety, such as isobutyl methacrylate and normal butyl methacrylate copolymers, etc.; phenolic resins including modified phenolic resins such as phenol formaldehyde resins; pentaerythritol phthalate; coumaroneindene resins; ester gum resins; vegetable oil polyamides; alkyd resins, including modified alkyds such as soya oil-modified and linseed oil-modified alkyds, phthalic, maleic and styrenated alkyds, etc.; and the like.

In addition, the electrostatic charge polarity of toner particles comprising dyes of the present invention can be enhanced or altered by the addition of suitable charge control agents if so desired. A variety of materials can be used as charge control agents. Illustrative of suitable charge agents would be the polyoxyethylated alkyl surfactants such as polyoxyethylated alkylamine, polyoxyethylene palmitate, polyoxyethylene stearate, etc. Other useful materials are magnesium and heavier metal soaps of fatty and aromatic acids as described by Beyer in U.S. Pat. No. 3,417,019. Useful metal soaps include cobalt naphthenate, magnesium naphthenate and manganese naphthenate, zinc resinate, calcium naphthenate, zinc linoleate, aluminum resinate, isopropyltitanium stearate, aluminum stearate and others, many of which are also described in U.S. Pat. No. 3,259,581. Typically, the amount of such materials used is less than about 2% by weight based on the weight of toner. In certain instances, the resinous binder per se can function as the charge control agent, as can the colorant.

Suitable developer compositions can be prepared simply by grinding the pigments to the appropriate size and dispersing the pigment powder in a carrier liquid without the addition of a resinous binder and/or charge control agent. A developer which does not contain a binder material produces developed images which are not fixed. Accordingly, it would be necessary to overcoat such images by spraying with a lacquer composition in order to hold the pigment particles in place. Typical developer compositions comprising the pigments of this invention will contain the pigments in a concentration of from about 0.01 to about 1.0 gram per liter. When a resin binder is used, the pigment-to-binder weight ratio can vary from about 1:20 to about 2:1.

The invention is further illustrated by the examples which follow.

EXAMPLE 1

Preparation of 1,4-bis[p-(N-ethyl-N-2-hydroxyethylamino)phenylazo]-2,3-naphthalenediol

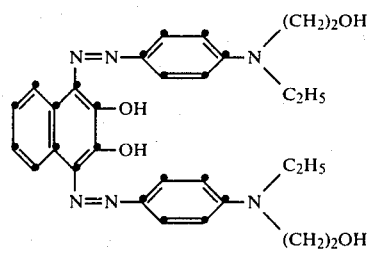

A solution of 0.200 mole of p-(N-ethyl-N-2-hydroxyethylamino)benzenediazonium chloride (made as in the following procedure: To a stirred solution of 0.200 g. mole of N-ethyl-N-2-hydroxyethyl-p-phenylenediamine bisulfate, 0.80 g. mole of concentrated hydrochloric acid and 400 ml. of distilled water was added dropwise with stirring at 0°–10° C. a solution of 0.20 g. mole of sodium nitrite in water.) was added dropwise with stirring at 0°–5° C. to a solution of 15.9 g. (0.0994 mole) of 2,3-naphthalenediol, 400 ml. of pyridine and 150 ml. of aqueous 28% ammonia. The mixture was stirred for 1½ hr. after completion of the addition. The solid was collected, washed with methanol and then water, and dried in vacuum at 45° C. to give 42.3 g. of green product, m.p. 240° C. Recrystallization from 400 ml. of pyridine gave 33.2 g. (61.6%) of green crystals, m.p. 247° C. (dec.), $\lambda_{max}^{DMF}$ (log E) 614 nm. (4.82), 657 nm. (4.87).

Anal. Calc'd. for $C_{30}H_{34}N_6O_4$: C, 66.6; H, 6.28; N, 15.5. Found: C, 66.2; H, 6.3; N, 15.3.

EXAMPLE 2

Preparation of 1,4-bis[4-(N-ethyl-N-2-hydroxyethylamino)phenylazo]-2,3-dihydroxy-7-naphthalenesulfonic acid ammonium salt

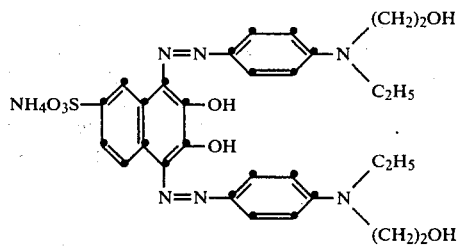

A solution of 34.5 g. (0.100 mole) of 2,3-diacetoxy-7-naphthalenesulfonic acid sodium salt (see Example 3), 40.0 g. (1.00 mole) of sodium hydroxide and 700 ml. of water was stirred for 2 hr. at 25°–30° C., cooled and treated dropwise at 5°–10° C. with a solution of 0.200 mole of p-(N-ethyl-N-2-hydroxyethylamino)benzenediazonium chloride made as in the procedure of Example 1. The mixture was stirred overnight. The solid was collected, pressed as dry as possible, dissolved in 1 l. of water and treated dropwise with a hot solution of 28.7 g. (0.100 mole) of 1,2,3-triphenylguanidine, 250 ml. of ethyl alcohol, 15 ml. of glacial acetic acid and 15 ml. of water. After 1 hr., the solid was collected, washed with water and vacuum-dried at 35° C. to give 71.8 g. of a mixture of blue and violet dyes. It was stirred for 1 hr. in 760 ml. of methanol, collected, washed with 500 ml. of methanol and dried to give 25.1 g., m.p. 238°–239° C. (Thin-layer chromatography of this material showed only the blue component.) Stirring this material for 1 hr. at reflux with a solution of 2.5 g. (0.032 mole) of ammonium acetate in 350 ml. of ethyl alcohol, collection (without cooling) of the solid, washing with ethyl alcohol and vacuum-drying at 45° C. gave 20.5 g. (32.1%) of blue powder.

Anal. Calc'd. for $C_{30}H_{37}N_7O_7S$: C, 56.4; H, 5.78; N, 15.3; S, 5.00. Found: C, 58.8; H, 5.6; N, 13.2; S, 4.4.

EXAMPLE 3

Preparation of 2,3-diacetoxy-7-naphthalenesulfonic acid sodium salt

A mixture of 72.3 g. (0.276 mole) of 2,3-dihydroxy-7-naphthalenesulfonic acid sodium salt, 360 ml. of acetic anhydride and 5 drops of concentrated sulfuric acid was stirred 8 hr. on a steam bath and cooled overnight to room temperature. The solid was collected, washed with acetic anhydride, pressed as dry as possible, dissolved in 400 ml. of water, mixed with 500 ml. of 20% sodium chloride solution and allowed to stand overnight. The solid was collected, washed with 20% sodium chloride and dried to give 69.9 g. (73.1%) of colorless crystals, m.p. 270°–300° C. (dec.).

Anal. calc'd. for $C_{14}H_{11}NaO_7S$: C, 48.6; H, 3.18; Na, 6.65; S, 9.25. Found: C, 45.7; H, 3.3; Na, 6.4; S, 8.7.

EXAMPLE 4

Preparation of 2,3-diacetoxy-7-naphthalenesulfonyl chloride

A mixture of 14.4 g. (0.0416 mole) of 2,3-diacetoxy-7-naphthalenesulfonic acid sodium salt, 150 ml. of thionyl chloride and 1 ml. of DMF was stirred 1 hr. at room temperature and 1 hr. at reflux, cooled to room temperature and poured into 1 l. of petroleum ether. The solid was collected, washed with petroleum ether and dried to give 11.3 g. (79.9%) of cream-colored product, m.p. 158°–167° C.

Anal. calc'd. for $C_{14}H_{11}ClO_6S$: C, 49.0; H, 3.21; Cl, 10.4; S, 9.33. Found: C, 48.3; H, 3.4; Cl, 9.8; S, 10.1.

EXAMPLE 5

Preparation of 2,3-dihydroxy-7-naphthalenesulfonamide

A solution of 20.0 g. (0.0583 mole) of 2,3-diacetoxy-7-naphthalenesulfonyl chloride in 300 ml. of tetrahydrofuran was treated with 8.7 ml. (0.13 mole) of aqueous 28% ammonia. The solid (9.9 g., infrared spectrum identical with that of 6,7-diacetoxy-2-naphthalenesulfonic acid sodium salt) was removed by filtration and the filtrate evaporated to dryness. The residue was dissolved in 150 ml. of ethyl acetate. The residue from evaporation of the dried (anhydrous sodium sulfate) solution was slurried with four 100-ml. portions of ether and then dissolved in 150 ml. of 3A alcohol. The solution was saturated with hydrogen chloride, allowed to stand overnight, and then concentrated at the water pump to give 9.7 g. of colorless residue. Recrystallization from 50 ml. of water gave 5.1 g. (37%) of pale violet solid, m.p. 218°–228° C.

Anal. Calc'd. for $C_{10}H_9NO_4S$: C, 50.2; H, 3.77; N, 5.85; S, 13.4. Found: C, 50.2; H, 4.1; N, 5.3; S, 13.0.

EXAMPLE 6

Preparation of 1,4-bis(p-anisylazo)-2,3-naphthalenediol

To a stirred solution of 24.6 g. (0.200 mole) of p-anisidine, 50 ml. (0.60 mole) of concentrated hydrochloric acid and 100 ml. of water was added dropwise at 0°–5° C. a solution of 13.8 g. (0.200 mole) of sodium nitrite in 30 ml. of water. The diazonium salt solution was stirred for 10 min. after the final addition, then was added dropwise to a solution of 15.9 g. (0.0944 mole) of 2,3-naphthalenediol, 110 ml. of 28% aqueous ammonia and 350 ml. of pyridine at 5°–10° C. The mixture was stirred for 1½ hr. after completion of the addition. The solid was collected, washed with methanol and then water, and dried to give 26.7 g. of crude product, m.p. 245°–251° C. Recrystallization from pyridine gave 20.7 g. (48.5%) of dark solid, m.p. 258°–260° C.

EXAMPLES 7–15

Dyes having Composition Nos. 8–16 listed in Table 1 were prepared by the same procedure as that described in Example 6 except using different starting materials. The substituents described in Table 1 below refer to the R's in Formula I.

TABLE 1

| Ex. No. | Composition No. | Substituents (See Formula I) | | | Melting Point °C. |
|---|---|---|---|---|---|
| | | $R^1$ | $R^2$ | $R^3$ | |
| 6 | 7* | H | p-CH$_3$O— | H | 258–260 |
| 7 | 8 | H | o-CH$_3$O— | H | 271–273 |
| 8 | 9 | H | p-C$_2$H$_5$O— | H | 255–257 |
| 9 | 10 | H | p-n-C$_3$H$_7$O— | H | 242–244 |
| 10 | 11 | 6-SO$_3$Na | p-CH$_3$O— | H | >385 |
| 11 | 12 | 6-SO$_3$Na | o-CH$_3$O— | H | >385 |
| 12 | 13 | 6-SO$_2$NH$_2$ | 4-OCH$_3$ | H | 258–260 |
| 13 | 14 | H | 4-OCH$_2$CONH$_2$ | H | 301–303 |
| 14 | 15 | H | 4-OCH$_3$ | 2-NO$_2$ | 308–312 |
| 15 | 16 | H | 2-OCH$_3$ | 5-NO$_2$ | 331–333 |

*Example 6

The materials defined hereinbelow are used in the following examples:

| | |
|---|---|
| Isopar-G: | a liquid mixture of aliphatic hydrocarbons obtained from Humble Oil & Refining Co. |
| Beckosol 7: | a soya-modified alkyd resin containing 42% phthalic anhydride and 41% soya fatty acids from Reichold Chemical Co. |
| Solvesso 100: | a hydrocarbon solvent consisting of alkylbenzenes from Esso Standard Oil Co. |
| VT: | vinyl toluene |
| LM: | lauryl methacrylate |
| LiM: | lithium methacrylate |
| MA: | methacrylic acid |
| EA: | ethyl acrylate |
| EM: | ethyl methacrylate |
| LiSEM: | lithium sulfoethyl methacrylate |
| t-BuS: | tertiary butyl styrene |
| VT/LM/LiM/MA: | a mixture of 56% VT, 40% LM, 3.6% LiM and 0.4% MA solids by weight |
| EA/EM/LM/LiSEM: | a mixture of 46% EA, 26% EM, 16% LM and 12% LiSEM solids by weight |
| t-BuS/LM/LiM/MA: | a mixture of 56% t-BuS, 40% LM, 3.6% LiM and 0.4% MA solids by |

| | |
|---|---|
| | -continued |
| | weight |

EXAMPLE 16

To 15.6 ml. VT/LM/LiM/MA solution (7% Solvesso 100 solution) was added 0.8 g. of pigment of Example 2. The mixture was ball-milled for a week. To 3.5 g. of the concentrate was added 0.7 g. EA/EM/LM/LiSEM solution (14% Solvesso 100 solution). The mixture was then dispersed in 500 ml Isopar G by ultrasonic means. The resulting developer, when used to develop electrostatic charge patterns yielded developed images of good quality and high resolution. The images from a second-generation process (obtained on diazo vesicular materials) also show good continuous tone.

EXAMPLE 17

With 30 ml. VT/LM/LiM/MA (7% Solvesso 100 solution), 2.0 g. of the pigment of Example 1 were mixed and ball-milled for 10 days. A developer was then prepared by adding to 2.98 g. of the concentration 0.7 g. binder solution EA/EM/LM/LiSEM (14% Solvesso 100 solution) and dispersing the mixture in 500 ml. of Isopar-G by ultrasonic means. The developer was made up of particles less than 1μ in size and yielded high-quality images. Images obtained in the second-generation process exhibited low contrast and excellent continuous tone.

EXAMPLE 18

To 30 ml. VT/LM/LiM/MA 7% solution, 2.0 g. of the pigment of Example 1 were added and ball-milled for 15 days. A developer was then prepared by adding 0.7 g. Beckosol-7 (14% Solvesso 100 solution) and 0.15 g. cobalt naphthanate to 2.98 g. concentrate and dispersing the mixture in 500 ml. Isopar-G by ultrasonic means. Images from such a developer exhibited high resolution, high density and very high quality. Continuous tone and low contrast were again the properties of the second-generation images.

EXAMPLE 19

In 83.4 g. t-BuS/LM/LiM/MA (7% Solvesso 100 solution), 4.0 g. of Peerless 155 carbon black (Cities Service) were ball-milled for 15 days. To 3.83 g. of the concentrate was added 0.7 g. EA/EM/LM/LiSEM solution (14% solution). The mixture was then dispersed in Isopar-G by ultrasonic means. The images from this developer showed very high resolution and good overall quality. The second-generation process, however, produced images with extremely high contrast and thus did not produce acceptable continuous tone prints.

EXAMPLE 20

In 41.7 g. VT/LM/LiM/MA (7% solution), 3.0 g. of Indofast Blue (B-450 of Harmon Colors) pigment were ball-milled for 15 days. The images from the resulting developer exhibited high quality and good resolution. However, the second-generation diazo process produced no image since actinic light was not absorbed by this pigment.

EXAMPLE 21

A concentrated liquid toner was prepared by ball-milling 3.0 g. of the pigment of Example 6 in a 7%

Solvesso 100 solution of 3.9 g. of VT/LM/LiM/MA (1.0 to 1.3 pigment-to-polymer ratio). A liquid toner was then obtained by adding to an aliquot of the concentrate a sufficient amount of the EA/EM/LM-/LiSEM binder solution to obtain a mixture having a 1/1.3/0.5 pigment-to-stabilizer-to-binder ratio, and diluting the mixture to 1 liter with Isopar-G under ultrasonic shear to yield a liquid toner having 0.35 g/l pigment.

The resultant developer had particle size $\leq 2\mu$, was positively charged and, when used in the conventional electrophotographic process, provided excellent, neutral-toned images.

EXAMPLE 22

From the concentrate described in Example 21, another liquid toner was obtained by replacing the poly EA/EM/LM/LiSEM binder with chlorinated polyethylene solution at 1/1.3/0.5 pigment-to-stabilizer-to-binder ratio. The final developer was negatively charged, well-dispersed and yielded excellent, neutral images.

EXAMPLE 23

A concentrated liquid toner using the pigment of Example 7 was prepared by ball-milling 3.0 g. of the pigment as in Example 21. A diluted developer at 0.35 g./l. pigment content was obtained as in Example 21. Excellent-quality electrophotographic images were obtained.

EXAMPLE 24

A concentrated liquid toner was prepared by ball-milling 3.0 g. of the pigment of Example 10 in a 7% Solvesso 100 solution of 3.0 g. of poly VT/LM/LiM/MA at 1.0 to 1.0 pigment-to-polymer ratio. A working developer was then obtained as in Example 21. The electrophotographic images obtained were also of excellent quality.

Although the invention has been described in considerable detail with particular reference to certain preferred embodiments thereof, variations and modifications can be effected within the spirit and scope of the invention.

We claim:

1. A compound of the formula

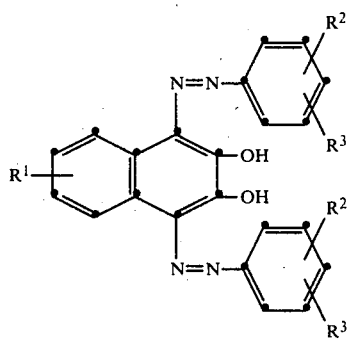

wherein:
R$^1$ is hydrogen, —COOH, —CONH$_2$, —SO$_2$NH$_2$ or —SO$_3$M and M is a cation;
R$^2$ is a lower alkoxy radical, —OCH$_2$CONH$_2$, or

R$^3$ is hydrogen or nitro; and
R$^4$ and R$^5$ are the same or different lower alkyl or lower hydroxyalkyl radicals.

2. A compound of claim 1 wherein M is Na$^+$ or NH$_4^+$.

3. A compound of claim 1 wherein R$^2$ is —OCH$_2$CONH$_2$.

4. A compound of claim 1 wherein R$^2$ is methoxy.

5. A compound of claim 4 wherein R$^3$ is —NO$_2$.

6. A compound of claim 1 wherein the compound is 1,4-bis(p-anisylazo)-2,3-naphthalenediol.

7. A compound of claim 1 wherein the compound is 1,4-bis(o-anisylazo)-2,3-naphthalenediol.

8. A compound of claim 1 wherein the compound is 1,4-bis(p-ethoxyphenylazo)-2,3-naphthalenediol.

9. A compound of claim 1 wherein the compound is 1,4-bis(4-n-propoxyphenylazo)-2,3-naphthalenediol.

10. A compound of claim 1 wherein the compound is 1,4-bis(p-anisylazo)-2,3-dihydroxy-6-naphthalenesulfonic acid sodium salt.

11. A compound of claim 1 wherein the compound is 1,4-bis(o-anisylazo)-2,3-dihydroxy-6-naphthalenesulfonic acid sodium salt.

12. A compound of claim 1 wherein the compound is 1,4-bis(4-anisylazo)-2,3-dihydroxy-6-naphthalenesulfonamide.

13. A compound of claim 1 wherein the compound is 1,4-(bis(5-nitro-2-anisylazo)-2,3-naphthalenediol.

14. A compound of the formula

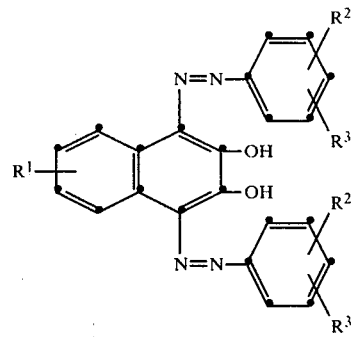

wherein:
R$^1$ is hydrogen, —COOH, —CONH$_2$, —SO$_2$NH$_2$ or —SO$_3$M and M is a cation;
R$^2$ is —OCH$_2$CONH$_2$ or

R$^3$ is hydrogen; and
R$^4$ and R$^5$ are the same or different lower alkyl or lower hydroxyalkyl radicals.

15. A compound of claim 14 wherein R$^2$ is —OCH$_2$CONH$_2$.

16. A compound of claim 14 wherein the compound is 1,4-bis(4-carbamoylmethoxyphenylazo)-2,3-naphthalenediol.

17. A compound of claim 14 wherein the compound is 1,4-bis[p-(N-ethyl-N-2-hydroxyethylamino)-phenylazo]-2,3-naphthalenediol.

* * * * *